United States Patent
Tohzaka et al.

(10) Patent No.: US 8,923,913 B2
(45) Date of Patent: Dec. 30, 2014

(54) CONTROL STATION AND WIRELESS SYSTEM

(75) Inventors: Yuji Tohzaka, Kanagawa-ken (JP); Hidetsugu Aoki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 192 days.

(21) Appl. No.: 13/426,344

(22) Filed: Mar. 21, 2012

(65) Prior Publication Data

US 2012/0178495 A1  Jul. 12, 2012

Related U.S. Application Data

(63) Continuation of application No. PCT/JP2010/001726, filed on Mar. 11, 2010.

(51) Int. Cl.
| | | |
|---|---|---|
| H04B 7/02 | (2006.01) | |
| H04W 99/00 | (2009.01) | |
| H04L 5/00 | (2006.01) | |

(52) U.S. Cl.
CPC ............. *H04L 5/0007* (2013.01); *H04W 99/00* (2013.01); *H04L 5/0053* (2013.01); *H04L 5/0035* (2013.01); *H04B 7/022* (2013.01)
USPC .......... 455/524; 455/56.1; 455/560; 370/315; 370/338; 375/260

(58) Field of Classification Search
CPC .... H04L 5/0035; H04L 5/0039; H04L 5/0048
See application file for complete search history.

(56) References Cited

U.S. PATENT DOCUMENTS

| | | | |
|---|---|---|---|
| 7,826,848 B2 | 11/2010 | Tao et al. | |
| 2002/0032004 A1* | 3/2002 | Widrow | .......................... 455/22 |
| 2007/0248172 A1 | 10/2007 | Mehta et al. | |
| 2008/0165866 A1 | 7/2008 | Teo et al. | |
| 2008/0274692 A1* | 11/2008 | Larsson | .......................... 455/24 |
| 2009/0080406 A1* | 3/2009 | Gopal et al. | .................. 370/350 |
| 2010/0272009 A1* | 10/2010 | Cheng et al. | ................... 370/315 |

FOREIGN PATENT DOCUMENTS

| | | |
|---|---|---|
| JP | 2008-172753 A | 7/2008 |
| JP | 2009-517918 A | 4/2009 |
| WO | WO 2007/123029 A1 | 11/2007 |
| WO | WO 2009/057438 A1 | 5/2009 |
| WO | WO 2011/111106 A1 | 9/2011 |

OTHER PUBLICATIONS

International Preliminary Report on Patentability (IPRP) and Written Opinion dated Oct. 11, 2012 (in English) issued in parent International Application No. PCT/JP2010/001726.
Japanese Office Action dated Aug. 6, 2013 (and English translation thereof) in counterpart Japanese Application No. 2011-541977.
International Search Report (ISR) dated Jun. 8, 2010 (and English translation thereof) issued in parent International Application No. PCT/JP2010/001726.

* cited by examiner

*Primary Examiner* — Yuwen Pan
*Assistant Examiner* — Fanghwa Wang
(74) *Attorney, Agent, or Firm* — Holtz, Holtz, Goodman & Chick PC

(57) ABSTRACT

A first extended base station that forms a first cell and a second extended base station that forms a second cell operate for a cooperative communication of transmitting same data to a user terminal located in the first cell. A second signal processor that corresponds to the second extended base station generates a training signal specific to the first extended base station and the first extended base station and the second extended base station transmit same data and same training signals. Thus, a cooperative communication can be realized in a system that uses a training signal specific to a base station.

7 Claims, 10 Drawing Sheets

CONTROL STATION AND WIRELESS SYSTEM

CROSS-REFERENCE TO RELATED APPLICATION

This application is based upon and claims the benefit of priority from the prior International Application No. PCT/JP2010/001726 filed on 11 Mar. 2010, the entire contents of which are incorporated herein by reference.

FIELD

The present disclosure relates to wireless communications.

BACKGROUND

The throughput of cellular communications has been dramatically raised as a result of introduction of MIMO (multiple-input multiple output) transmission techniques. However, a user terminal located at or near the boarder of the cell formed by a base station cannot obtain a high throughput due to a reduced power level of the desired radio wave and inter-cellular interferences.

So-called cooperative communication of transmitting same and identical data from a plurality of base stations that form different cells to a same user terminal is known as means for solving the above identified problem. With cooperative communication, it is possible to improve the power level of a desired radio wave and reduce interferences.

For example, when two base stations (the first base station and the second base station) are engaged in a cooperative communication and the transmitted data transmitted from each of the first base station and the second base station is x, while the received signal received by a user terminal is y, an expression of $y=(H_1+H_2)x+n$ holds true, where $H_1$ and $H_2$ are the propagation path matrices between the first base station and the user terminal and between the second base station and the user terminal respectively and n is a noise signal. For the user terminal to determine the transmitted data x transmitted from the base stations from the received signal y, it needs to determine $(H_1+H_2)$. As $(H_1+H_2)$ is determined, the user terminal can realize a cooperative communication for acquiring the transmitted data.

The user terminal determines the propagation path matrix H by receiving and processing the training signal transmitted from a base station.

A training signal is defined by a specification so as to be a signal specific to the identifier for identifying a base station depending on communications standards. According to such a communication standard, the first base station and the second base station transmit respective training signals that are different from each other.

There are some user terminals that are not equipped with a feature of simultaneously processing a plurality of training signals that are different from each other when it receives such training signals. If such a terminal receives training signals that are different from each other respectively from the first base station and the second base station, it can only process the training signal transmitted from one of the base stations. Then, as a result, the terminal can determine only either of the propagation path matrices, $H_1$ or $H_2$. Therefore, the terminal cannot determine $(H_1+H_2)$ and hence cannot realize any cooperative communication.

In an aspect, an object of the present embodiment is to provide a wire less communication device that can realize a cooperative communication when each base station has a training signal specific to it and each terminal is not equipped with a feature of simultaneously processing a plurality of different training signals.

In an aspect of the present embodiment, there is provided a control station to be connected to a first extended base station that forms a first cell and transmits data and training signals and a second extended base station that forms a second cell and transmits data and training signals, the control station including:

a first signal processor that generates a first training signal specific to the first extended base station; and a second signal processor that generates a second training signal specific to the second extended base station;

the first signal processor and the second signal processor generating first training signals at the time of transmitting same data to a first user terminal located in an overlapping area of the first cell and the second cell byway of the first extended base station and the second extended base station for a cooperative communication;

both the training signal transmitted to the first user terminal by way of the first extended base station and the training signal transmitted to the first user terminal by way of the second extended base station at the time of cooperative communication being the first training signals.

DETAILED DESCRIPTION

Figure 1:
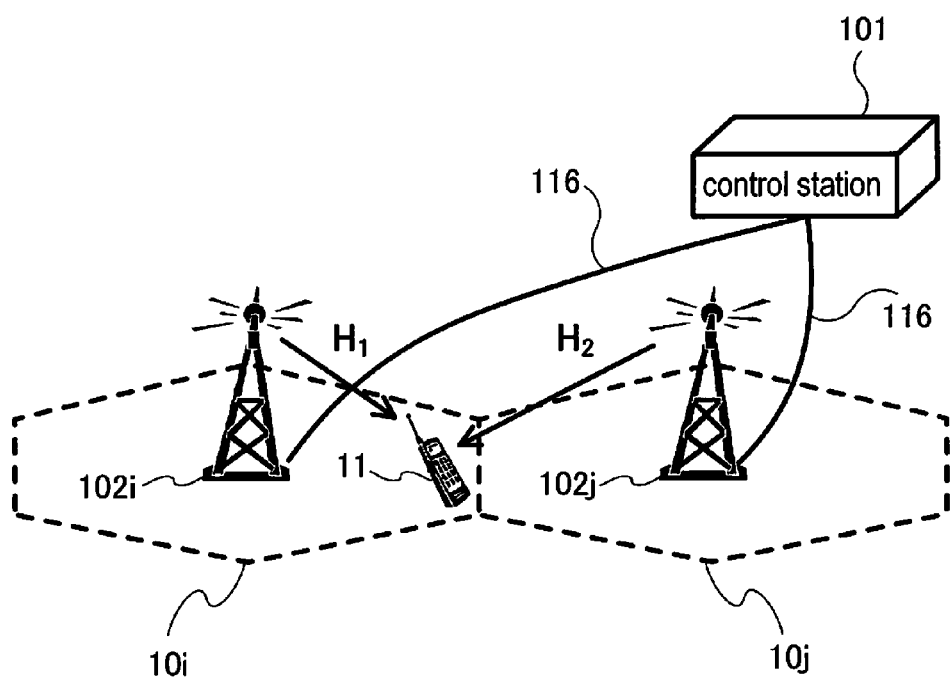
FIG. 1 is a schematic conceptual illustration of a communication system according to an embodiment.

Now, embodiments will be described below by referring to the drawings.

[First Embodiment]

FIG. 1 is a schematic conceptual illustration of the entire system according to the first embodiment. An extended base station 102*i* and an extended base station 102*j* form respective cells 10*i*, 10*j*. The extended base stations 102*i* and 102*j* are connected to a control station 101 by way of a backbone 116. The extended base station 102*i* and the extended base station 102*j* operate for a cooperative communication for a user terminal 11 located in the cell 10*i* formed by the extended base station 102*i*. $H_1$ and $H_2$ are respectively the propagation path matrix between the extended base station 102*i* and the user terminal 11 and the propagation path matrix between the extended base station 102*j* and the user terminal 11.

Figure 2:
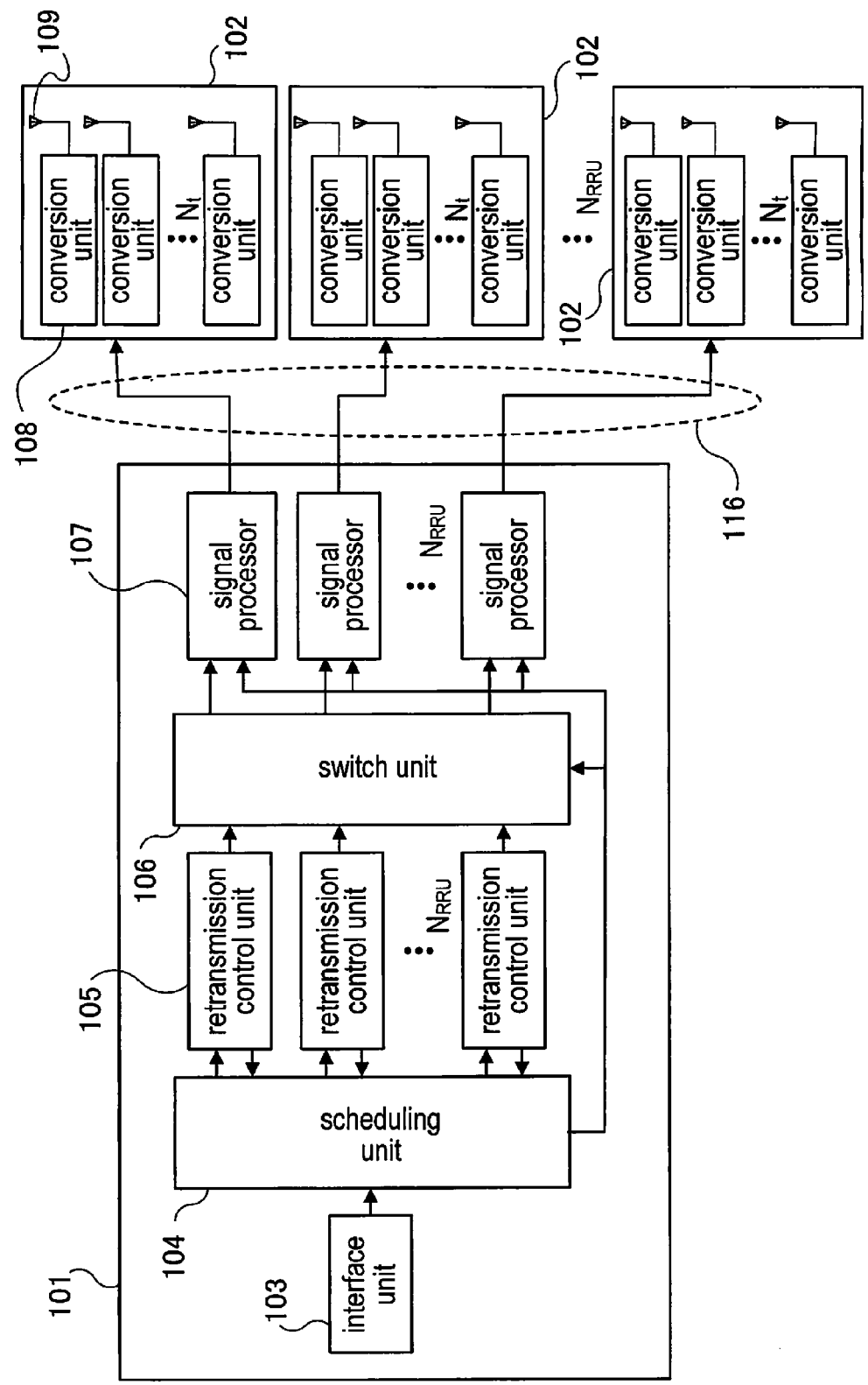
FIG. 2 is a schematic block configuration diagram of the wireless communication device according to the first embodiment.

FIG. 2 is a schematic block configuration diagram of the wireless communication device (wireless communication system) according to the first embodiment. The wireless communication device includes a control station 101 and $N_{RRU}$ ($N_{RRU}$: an integer not less than 2) extended base stations 102.

The control station 101 has an interface unit 103 (to be expressed as I/F unit 103 hereinafter), a scheduling unit 104 connected to the I/F unit 103, $N_{RRU}$ retransmission control units 105 connected to the scheduling unit 104, a switch unit 106 connected to the retransmission control units 105 and $N_{RRU}$ signal processors 107 connected to the switch unit 106. The signal processors 107 are connected to the extended base station 102 by way of the backbone 116. The scheduling unit 104 is connected to the switch unit 106 and the signal processors 107. The extended base station 102*i* and the extended base station 102*j* shown in FIG. 1 correspond to the extended base stations shown in FIG. 2. The retransmission control units 105 and the signal processors 107 are arranged so as to correspond to the respective extended base stations 102. The retransmission control units 105 and the signal processors 107 that respectively correspond to the extended base station 102*i* and the extended base station 102*j* will be expressed as retransmission control unit 105*i*, retransmission control unit 105*j*, signal processor 107*i* and signal processor 107*j*. The components of the wireless communication device that correspond to the extended base station 102*i* will be indicated by suffixes i whereas those of the wireless communication device that correspond to the extended base station 102*j* will be indicated by suffixes j in the following description.

Each of the extended base stations 102 has $N_t$ ($N_t$: an integer not less than 1) conversion units 108 and $N_t$ antennas 109. It is not necessary for the extended base stations 102 to have a same number of conversion units 108 and a same number of antennas 109 and they may have conversion units 108 and antennas 109 whose number can vary.

Now, the function of each of the components of the wireless communication device of FIG. 1 will be described below.

Note that, in the following description, the extended base stations 102*i* and 102*j* are driven to operate for a cooperative communication, whereas only the extended base station 102*i* is driven to operate for communication that is not cooperative communication.

The I/F unit 103 acquires the user data transmitted to a user terminal from an external device. Additionally, the I/F unit 103 notifies the scheduling unit 104 of the acquired user data.

The scheduling unit 104 selects a user terminal to which the user data is to be transmitted and an extended base station 102 that is to be driven to transmit the user data. The scheduling unit 101 selects a user terminal to which the user data is to be transmitted and an extended base station 102 that is to be driven to transmit the user data according to the size and the Qos (quality of service) shown in the user data.

It is possible for the scheduling unit 104 to know the level of communication request of each user terminal from the size and the QoS shown in the user data and selects a user terminal showing a high level of communication request. The scheduling unit 104 selects the extended base station 102 that forms the cell in which the selected user terminal is located. When a cooperative communication is to be made, the scheduling unit 104 also select another extended base station 102. The scheduling unit 104 notifies the retransmission control unit 105 that corresponds to the base station 102 forming the cell in which the user terminal is located of the user data.

As the retransmission control unit 105 receives the user data from the scheduling unit 101, the retransmission control unit 105 notifies the corresponding signal processor 107 of the user data by way of the switch unit 106.

Figure 4:
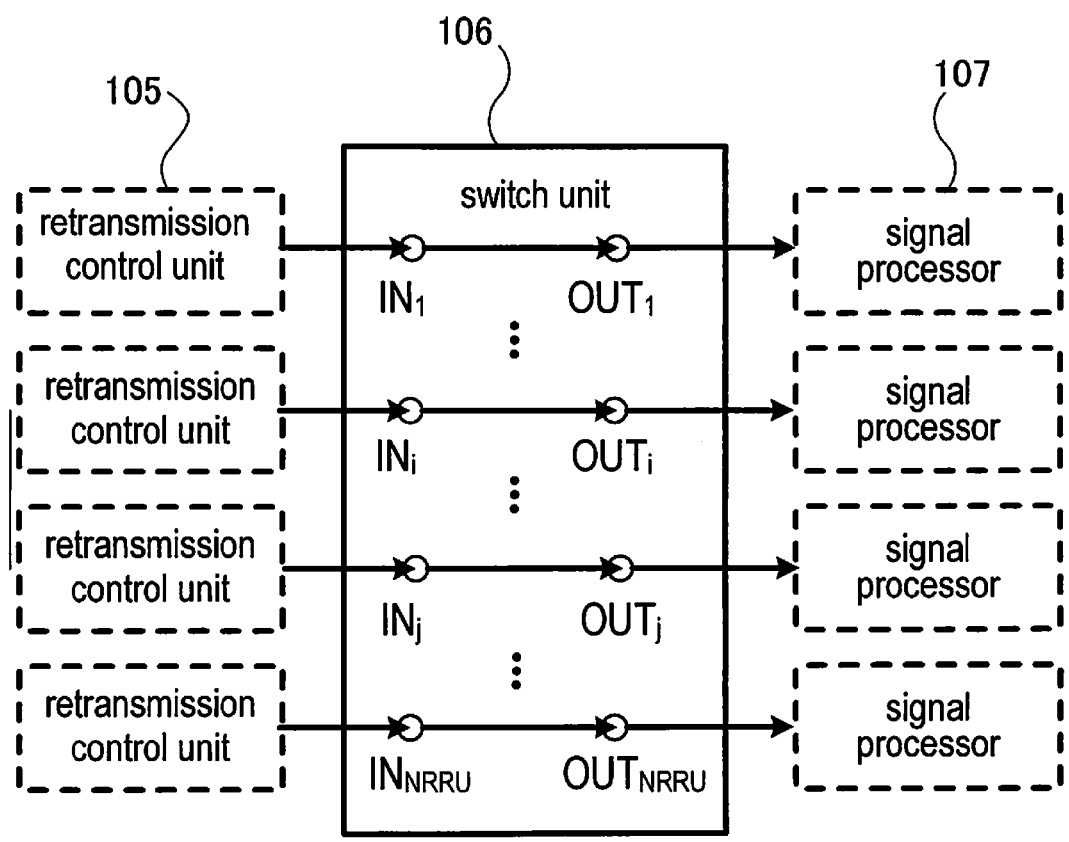
FIG. 4 is a schematic illustration of the switch unit when no cooperative communication is to be made.
Figure 5:
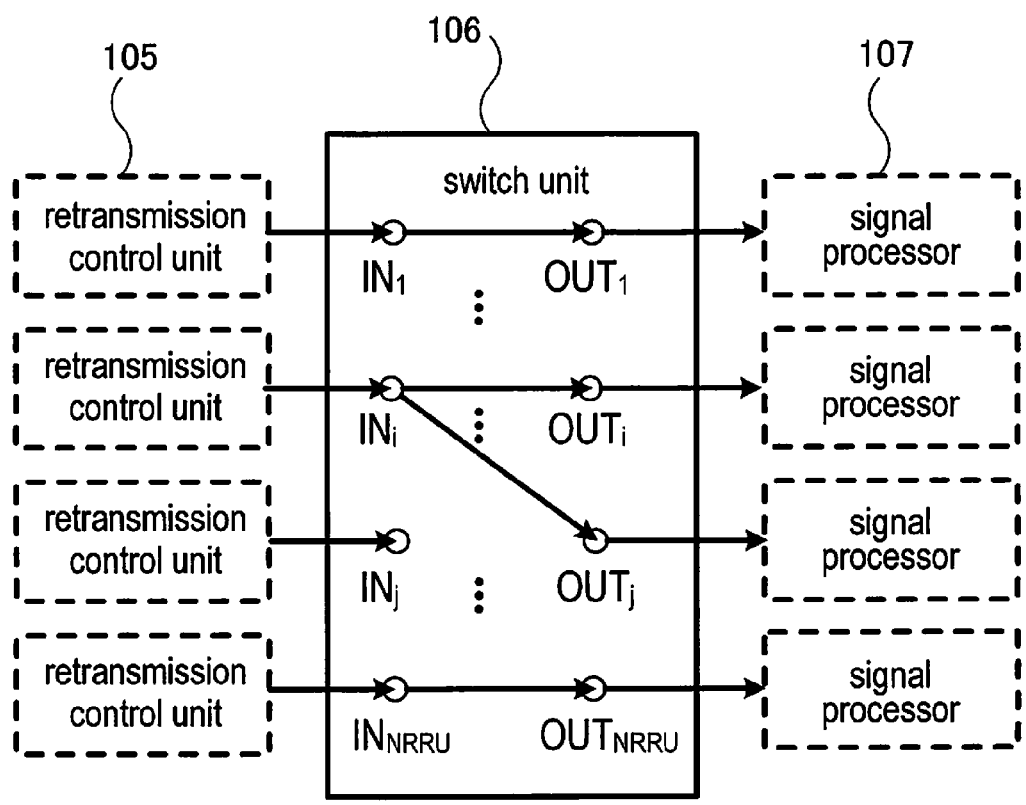
FIG. 5 is a schematic illustration of the switch unit when a cooperative communication is to be made.

The switch unit 106 switches the connectional relations between the retransmission control units 105 and the signal processors 107. FIG. 4 schematically illustrates the state of the switch unit 106 when no cooperative communication is to be made, whereas FIG. 5 schematically illustrates the state of the switch unit 106 when a cooperative communication is to be made. As shown in FIG. 4, when no cooperative communication is to be made, the switch unit 106 connects the retransmission control unit 105*i* to the signal processor 107*i* in such a way that they show a 1 to 1 correspondence. As shown in FIG. 5, when a cooperative communication is to be made, the switch unit 106 connects the retransmission control unit 105*i* to the signal processors 107*i* and 107*j*.

The signal processor 107 generates a data signal from the user data input to it from the retransmission control unit 105 by way of the switch unit 106 and also generates a training signal. Then, signal processor 107 generates a digital signal that includes the data signal and the training signal. The configuration and the function of the signal processor 107 will be described in detail hereinafter.

The conversion unit 108 of the extended base station 102 executes a process of converting the digital signal of which it is notified from the signal processor 107 into an analog signal and outputs the analog signal to the antenna 109. The conversion unit 108 has an ordinary configuration and includes a filter, a digital/analog (D/A) converter, a frequency modulator and a power amplifier.

The antenna 109 transmits the analog signal.

Figure 3:
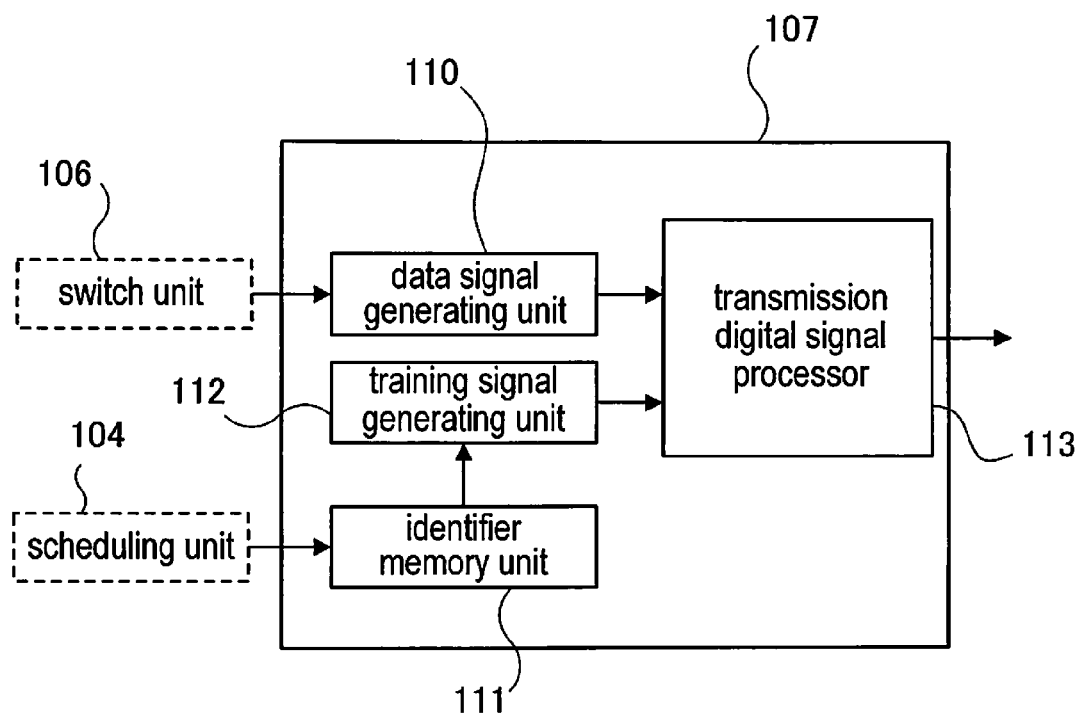
FIG. 3 is a schematic block configuration diagram of the signal processor according to the first embodiment.

Now, the configuration and the function of the signal processor 107 will be described below in detail. FIG. 3 schematically illustrates the configuration of the signal processor 107.

The signal processor 107 has a date signal generating unit 110 connected to the switch unit 106, an identifier memory unit 111 connected to the scheduling unit 104, a training signal generating unit 112 connected to the identifier memory unit 111 and a transmission digital signal processor 113 connected to the data signal generating unit 110 and the training signal generating unit 112.

The data signal generating unit 110 operates for channel coding on the user data input from the retransmission control unit 105 by way of the switch unit 106 and generates a data signal. Channel coding typically includes adding cyclic redundancy check codes, scrambling, error correction coding, bit interleaving and quadrature amplitude modulation.

The training signal generating unit 112 generates a training signal specific to an identifier, referring to the identifiers stored in the identifier memory unit 111.

The identifier memory unit 111 stores the identifiers of the extended base stations 102. Note that the identifiers are the identifiers assigned to the respective extended base stations 102 and specific to the respective extended base stations 102. In the following description, the extended base stations 102*i* and 102*j* respectively have identifier i and identifier j that are specific to them.

So long as no cooperative communication is being made, the identifier memory unit 111 stores only the identifier of the corresponding extended base station 102. In such an instance, the training signal generating unit 112 generates a training signal specific to the identifier that correspond to the extended base station 102. On the other hand, when a cooperative communication is to be made, as the identifier of the extended base station 102 that is different from the corresponding extended base station 102 is notified, the identifier memory unit 111 stores the notified identifier.

When the identifier memory unit 111 can store only a single identifier, the identifier memory unit 111 overwrites the notified identifier and stores it.

When the identifier memory unit 111 can store a plurality of identifiers, it stores all the identifiers of the extended base stations 102 that correspond to the notified identifiers. For example, the identifier memory unit 111 may be so configured as to include a first memory region for constantly storing the identifiers of the corresponding extended base stations 102 and a second memory region for temporarily storing the identifiers of extended base stations 102 that are different from the corresponding extended base stations 102. When the identifier memory unit 111 stores identifiers in the second memory region, the training signal generating unit 112 generates a training signal, referring to the identifiers stored in the second memory region. More specifically, the training signal generating unit 112 generates a training signal, referring to the identifiers of extended base stations 102 that are different from the corresponding extended base stations 102.

The transmission digital signal processor 113 executes transmission processing on a data signal and a training signal and generates a digital signal including the data signal and the training signal. In a single cell, the transmission digital signal processor 113 may, for example, execute transmission processing for MIMO (multiple-input multiple-output) transmission such as STBC (space-time block codes) for providing a transmission diversity effect or CDD (cyclic delay diversity) for providing a frequency diversity effect by cyclically shifting the transmission signal in the time direction. In an instance of cooperative communication, again, the transmission digital signal processor 113 executes MIMO transmission processing as described above. Note that the plurality of extended base stations that operate for a cooperative communication need to execute transmission processing in a same mode. While this embodiment is described in terms of single carrier transmission, similar processing is applicable to a multi-carrier transmission which may typically be OFDM (orthogonal frequency division multiplexing) or OFDMA (orthogonal frequency division multiple access).

Now, the operation of the wireless communication device and the function of each of the components thereof will be described in detail below.

The wireless communication device may or may not operate for a cooperative communication. Firstly, the operation of the wireless communication device that takes place when no cooperative communication is to be made will be described for the purpose of describing the operation that takes place when a cooperative communication is to be made in comparison.

An instance where the scheduling unit 104 selects a single extended base station in order to transmit user data to the user terminal selected as the destination to which the user data is to be transmitted (an instance where no cooperative communication is to be made) will be described.

In this case, the scheduling unit 104 notifies the retransmission control unit 105$i$ that corresponds to the selected extended base station 102$i$ of the user data notified from the I/F unit 103. As shown in FIG. 4, when no cooperative communication is to be made, the switch unit 106 connects the retransmission control unit 105$i$ and the signal processor 107$i$ so as to make them show a 1:1 correspondence. Therefore, the user data that the retransmission control unit 105$i$ outputs is notified only to the signal processor 107$i$ byway of the switch unit 106. As the user data is notified, the data signal generating unit 110$i$ generates a data signal from the user data. Besides, the training signal generating unit 112$i$ generates a training signal specific to the identifier i stored in the identifier memory unit 111$i$. The identifier i is the identifier specific to the extended base station 102$i$. Therefore, the training signal generating unit 112$i$ generates a training signal that is specific to the extended base station 102$i$. The transmission digital signal processor 113$i$ generates a digital signal from the data signal and the training signal. The conversion unit 108$i$ of the extended base station 102$i$ converts the digital signal into an analog signal and the antenna 109$i$ transmits the analog signal.

Now, the operation of the wireless communication device and the function of each of the components thereof when cooperative communication is to be made will be described below.

In the following description, of the extended base stations that operate for a cooperative communication, the extended base station 102$i$ is the extended base station that forms the cell in which the user terminal 11 is located whereas the extended base station 102$j$ is the extended base station that form the cell in which the user terminal 11 is not located as shown in FIG. 1.

The scheduling unit 104 notifies the retransmission control unit 105$i$ of the user data that is notified from the I/F unit 103. Additionally, the scheduling unit 104 notifies the switch unit 102 of an instruction signal that instructs the switch unit 102 to connect the retransmission control unit 105$i$ and the signal processors 107$i$ and 107$j$. Note that, however, when the retransmission control unit 105$i$ and the signal processor 107$i$ are already connected to each other before the notification, the instruction signal may be an instruction signal that instructs to connect the retransmission control unit 105$i$ and the signal processor 107$j$. Upon receiving the instruction signal, the switch unit 106 connects the retransmission control unit 105$i$ and the signal processors 107$i$ and 107$j$. FIG. 5 schematically illustrates the state of connection after the switch unit 106 receives the instruction signal. As the retransmission control unit 105$i$ outputs the user data, it is notified to the signal processors 107$i$ and 107$j$ by way of the switch unit 106.

Furthermore, the scheduling unit 104 notifies the identifier memory unit 111$j$ of the identifier i of the extended base station 102$i$. The identifier memory unit 111$j$ stores the notified identifier i.

The training signal generating unit 112$j$ of the signal processor 107$j$ that corresponds to the extended base station 102$j$ generates a training signal that is specific to the identifier i. The data signal generating unit 110$j$ generates a data signal from the user data input from the retransmission control unit 105$i$ byway of the switch unit 106. The transmission digital signal processor 113$j$ generates a digital signal from the data signal and the training signal. The conversion unit 108$j$ of the extended base station 102$j$ executes processing of converting the digital signal into an analog signal and the antenna 109$j$ transmits the analog signal.

Meanwhile, the training signal generating unit 112$i$ of the signal processor 107$i$ that corresponds to the extended base station 102$i$ also generates a training signal that is specific to the identifier i and the data signal generating unit 110$i$ generates a data signal from the user data input from the retransmission control unit 105$i$ by way of the switch unit 106. The transmission digital signal processor 113$i$ generates a digital signal from the data signal and the training signal. The conversion unit 108$i$ of the extended base station 102$i$ executes processing of converting the digital signal into an analog signal and the antenna 109$i$ transmits the analog signal.

As described above, in the wireless communication device of this embodiment, the analog signals that the extended base stations 102$i$ and 102$j$ transmit are analog signals generated from a same training signal and a same user data. Therefore, the user terminal can receive the analog signal produced by synthetically combining the two analog signals in space (propagation path). The user terminal can determine the sum ($H_1+H_2$) of the propagation path matrix $H_1$ between the extended base station 102$i$ and the user terminal and the propagation path matrix $H_2$ between the extended base station 102$j$ and the user terminal by processing the received training signal. As the user terminal can determine ($H_1+H_2$), the user terminal can then determine the user data that the extended base stations 102$i$ and 102$j$ transmitted from the received signal.

Now, the method by which the user terminal 11 determines ($H_1+H_2$) and the method by which the user terminal 11 acquires the user data that the extended base stations transmitted from the received reception signal will be described below by referring to FIG. 1 illustrating a specific example. If the signal vector that the extended base stations 102$i$ and 102$j$ transmit is transmission signal vector s of $N_t$ dimensions and the reception signal vector that the user terminal receives is reception signal vector y of $N_r$ dimensions, the relationship between vector s and vector y is expressed by mathematical formula (1). In mathematical formula (1), the matrix $H_1$ and the matrix $H_2$ are respectively the propagation path matrices between the extended base station 102$i$ and the user terminal 11 and the extended base station 102$j$ and the user terminal 11. If the number of antennas that the extended base station 102$i$ has and the number of antennas that the extended base station 102$j$ has are equally $N_t$ and the number of antennas of the user terminal is $N_r$ ($N_r$: an integer not less than 1), the matrix $H_1$ and the matrix $H_2$ are matrices of $N_r \times N_t (N_t \geq N_r)$ dimensions. Vector n is the noise signal vector of $N_r$ dimensions.

$$y=Hs+n$$

$$H=H_1+H_2 \quad (1)$$

As described above, each of the extended base station 102$i$ and the extended base station 102$j$ transmits training signal vector $s_{tr}$ that is specific to the extended base station 102$i$ and the user terminal 11 receives signal vector $y_{tr}$ produced by synthetically combining the training signals transmitted from the two extended base stations in space. Since the user terminal is located in the cell of the extended base station 102$i$, the training signal vector $s_{tr}$ that is specific to the extended base station 102$i$ is known to the user terminal. Therefore, $H=H_1+H_2$ of the mathematical formula (1) can be determined by substituting $y_{tr}$ and $s_{tr}$ respectively for the reception signal vector y and the transmission signal vector s in the mathematical formula [mathematical formula 1].

The user terminal 11 can determine reception weight $W_r$ that is a function of matrix H by computationally determining the matrix H. The method of determining reception weight $W_r$ will be described hereinafter. The user terminal 11 can take out user data vector $-S_{data}$ by multiplying the reception signal vector $y_{data}$ that corresponds to the user data that the extended base station 102 transmitted by the reception weight $W_r$ as shown in mathematical formula (2).

$$S_{data}=W_r y_{data} \quad (2)$$

Note that the reception weight $W_r$ can be determined by the method indicated by mathematical formula (3). The method of determining the reception weight $W_r$ by means of the method of the mathematical formula (3) is a computation method using the ZF (zero-forcing) criterion.

The computation method of determining the reception weight $W_r$ is not limited to the ZF criterion illustrated by the mathematical formula (3) and may alternatively be some other method using the MMSE (minimum mean square error) criterion or the like.

$$W_r=(H^H H)^{-1} H^H \quad (3)$$

Now, the period during which the wireless communication device of this embodiment operates for a cooperative communication will be described below.

The extended base stations 102 transmit, to the user terminal located in the cell formed by the extended base station 102, control signals with a predetermined cycle period for confirming that the user terminal is connected to the extended base station 102. The user terminal can confirm that the connection between itself and the extended base station to whose cell it belongs is continuing by receiving the control signals. When the user terminal cannot receive the control signals, the user terminal issues a handover request. The extended base stations 102 need to operate for a cooperative communication outside the period during which they transmit control signals in order to prevent such a handover request from being issued from the user terminal. The reason for this will be described below.

Such a control signal is a signal generated from control data and a training signal. When the extended base station 102$j$ transmits control signals in the period during which it is operating with the extended base station 102$i$ for a cooperative communication, the extended base station 102$j$ transmits control signals that include the control data that is output from the retransmission control unit 105$i$ and the training signal that is specific to the identifier i. In other words, the extended base station 102$j$ transmits control signals that are same as the control signals that the extended base station 102$i$ transmits. In this case, when the user terminal located in the cell formed by the extended base station 102$j$ receives a control signal, the user terminal does not recognize the control signal as control signal transmitted from the extended base station 102$j$. Therefore, then the user terminal issues a handover request. For this reason, the extended base stations 102 need to operate for a cooperative communication outside the period during which they transmit control signals in order to prevent such a handover request from being issued.

Figure 6:
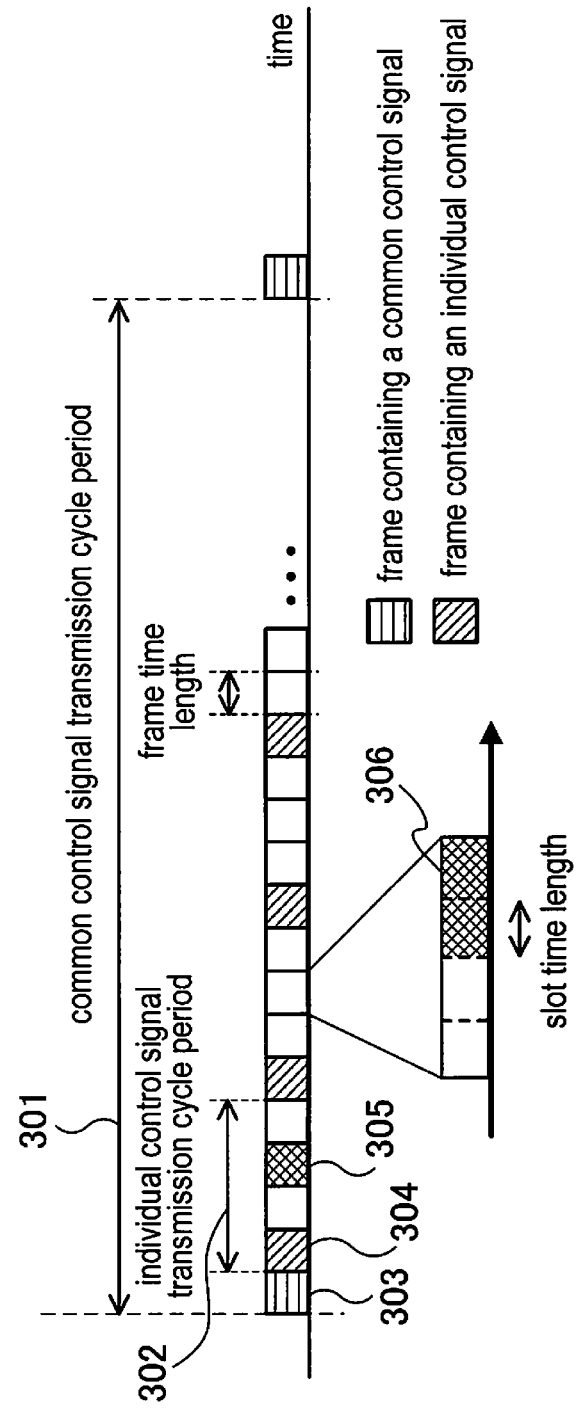
FIG. 6 is a schematic illustration of control signal transmission cycle periods and a cooperative communication period.

FIG. 6 schematically illustrates the periods of transmission of control signals when an XGP (eXtended Global Platform) is employed. This system provides common control signals and individual control signals as control signals.

A common control signal is a signal that all user terminals can receive. A frame that includes a common control signal is indicated as frame 303. A common control signal is transmitted with cycle period 301.

An individual control signal is a signal to be individually notified to a user terminal. A frame that includes an individual control signal is indicated as frame 304. An individual control signal is transmitted with cycle period 302.

In order to prevent a handover request from being issued by the user terminal located in the cell formed by the extended base station 102$j$, the scheduling unit 104 operates for a cooperative communication, avoiding the timings at which a common control signal and an individual control signal are transmitted as shown in FIG. 6. Therefore, the period of a cooperative communication is made at least less than the cycle period 302 of transmission of an individual control signal. Note that the period of a cooperative communication is not less than a slot time length that is the smallest unit of time resource to be assigned to the user terminal. In FIGS. 6, 305 and 306 indicate exemplar periods of cooperative communication. In FIG. 6, 305 indicates an example of cooperative communication that is made in a frame and 306 indicates an example of cooperative communication that is made in 2 slots.

Now, the operation of the wireless communication device for making the period of cooperative communication less than the transmission cycle period 302 of an individual control signal will be described below.

When a period of time that is shorter than the transmission cycle period 302 of an individual control signal has elapsed since the start of a cooperative communication, the scheduling unit 104 notifies the identifier memory unit 111j of update information for resetting the identifier j or memory information of the identifier memory unit 111j in order to restore the original state. Alternatively, at the time of operating for a cooperative communication and notifying the identifier memory unit 111j of the identifier i, the scheduling unit 104 may notify a selected period that is shorter than the transmission cycle period 302 of an individual control signal and reset the identifier j or memory information of the identifier memory unit 111j in order to restore the original state of the identifier memory unit 111j.

Upon receiving the notification of the identifier j, the identifier memory unit 111j writes the identifier j, switching from the identifier i. When the identifier memory unit 111j is notified of update information for resetting the identifier memory unit 111j or when a selected period has been notified, the identifier memory unit 111j is reset to restore the original state after the elapse of the selected period. More specifically, the identifier i stored in the identifier memory unit 111j is erased to produce a state where only the identifier j is stored.

Furthermore, when a period of time that is shorter than the transmission cycle period 302 of an individual control signal has elapsed since the start of a cooperative communication, the scheduling unit 104 notifies the switch unit 106 of an instruction signal for connecting the retransmission control unit 105j and the signal processor 107j.

With the above-described operations of the wireless communication device, the extended base station 102j can switch from a state where it operates for a cooperative communication with the extended base station 102i to a state where it does not operate for a cooperative communication. Additionally, the period of cooperative communication can be made to be less than the transmission cycle period 302 of an individual control signal. When the extended base station 102j transmits a control signal after the completion of a cooperative communication, the extended base station 102j transmits a control signal of the extended base station 102j itself. In other words, the extended base station 102j transmits a control signal that includes the control data that the retransmission control unit 105j outputs and the training signal that is specific to the identifier j to the user terminal located in the cell formed by the extended base station 102j.

In this way, it is possible to avoid any handover request from a user terminal by setting a period shorter than the transmission cycle period of an individual control signal for cooperative communication and avoiding the timing of transmitting a control signal for making a cooperative communication.

With the wireless communication device of this embodiment, it is possible to realize a cooperative communication in a situation where a communication standard requiring a training signal to be specific to the identifier of a base station is in effect and a user terminal is not provided with a functional feature of receiving a plurality of different training signals and processing them simultaneously by making base stations operating for a cooperative communication transmit same training signals during the period of cooperative communication.

[Second Embodiment]

Figure 7:
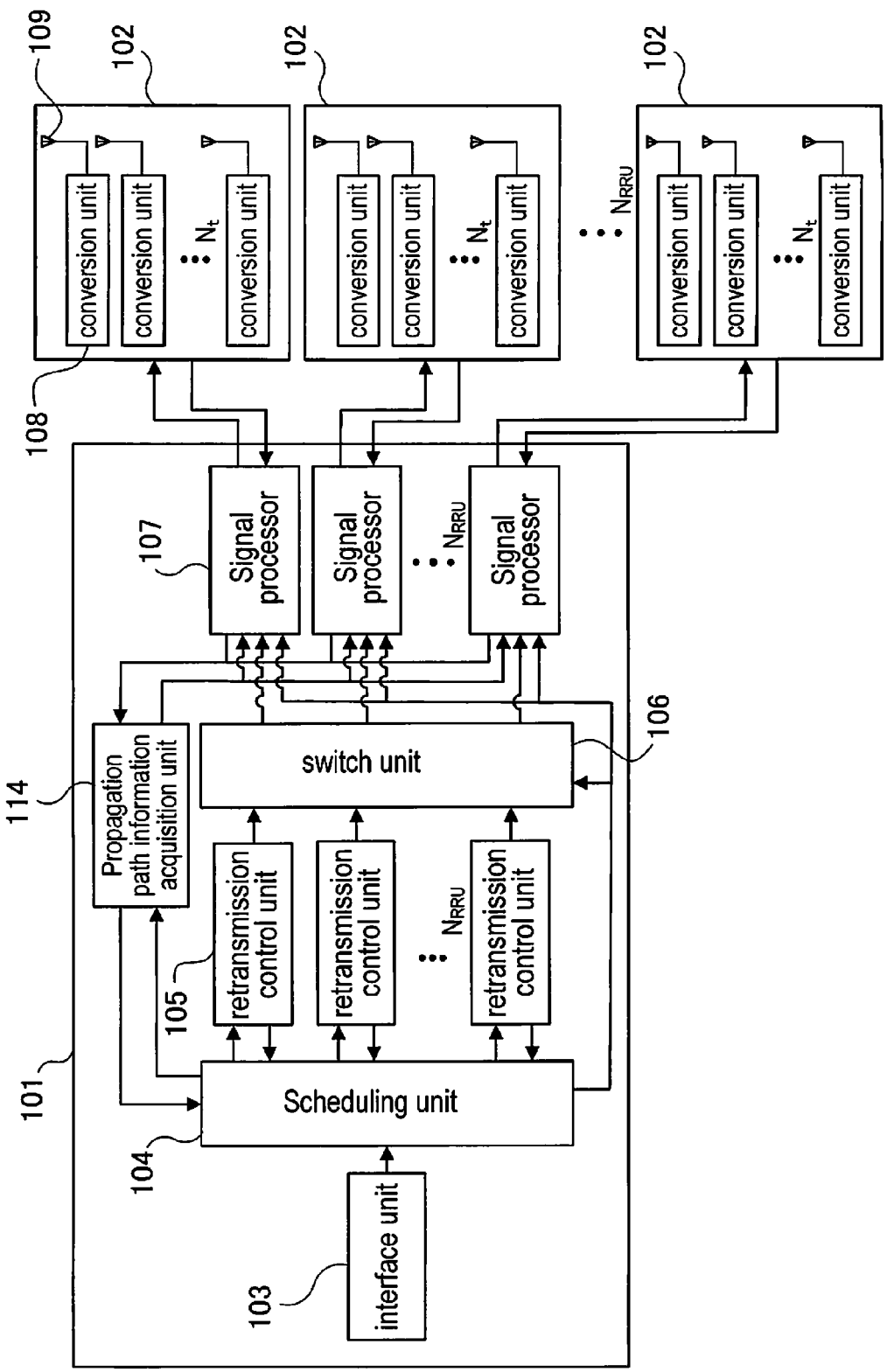
FIG. 7 is a schematic block configuration diagram of the wireless communication device according to the second embodiment.
Figure 8:
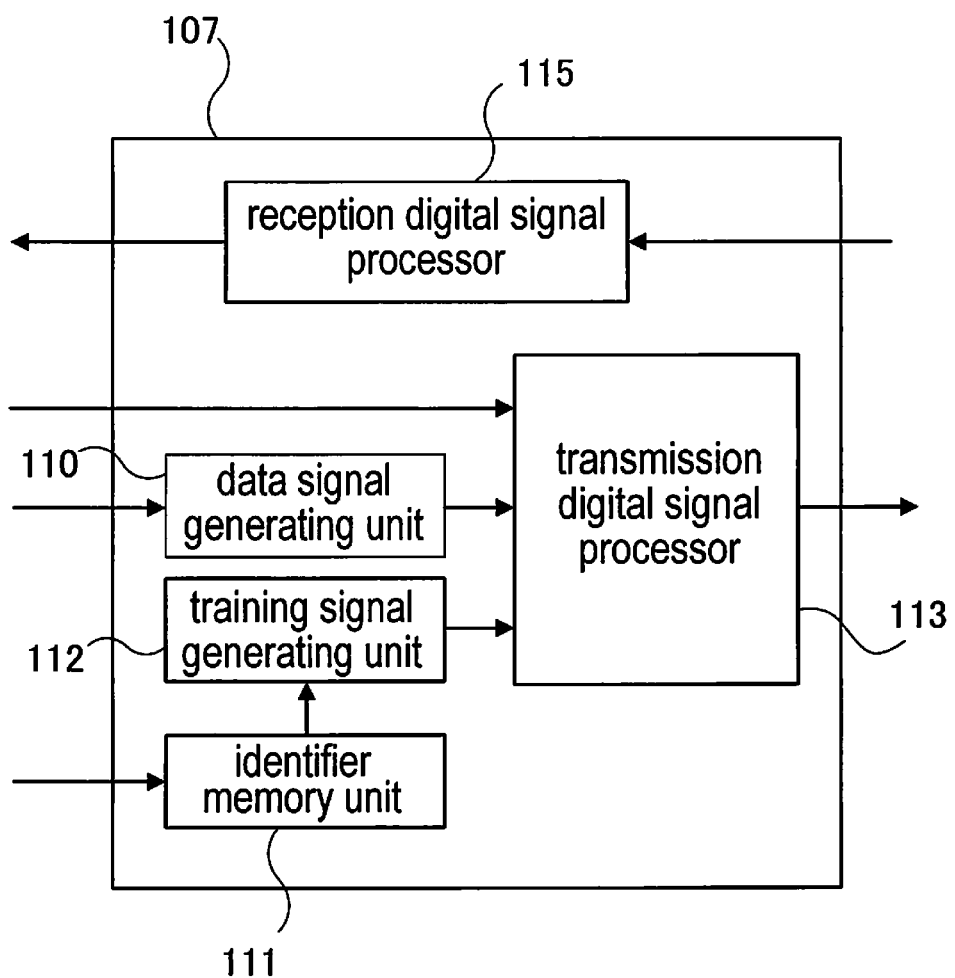
FIG. 8 is a schematic block configuration diagram of the signal processor according to the second embodiment.

Now, the wireless communication device according to the second embodiment will be described below. FIG. 7 schematically illustrates the configuration of the wireless communication device according to the second embodiment and FIG. 8 schematically illustrates the configuration of the signal processor 107 according to the second embodiment.

The wireless communication device according to the second embodiment acquires information on the propagation path between an extended base station 102 and a user terminal from the user terminal and selects a combination of a user terminal that is the destination of transmission of user data and an extended base station 102 for transmitting the user data, using the propagation path information. Additionally, the wireless communication device of the second embodiment determines if a cooperative communication is to be made or not, using the propagation path information. Furthermore, the wireless communication device of the second embodiment computes the transmission weight to be used for making a cooperative communication, using the propagation path information.

The wireless communication device of the second embodiment differs from the wireless communication device of the first embodiment in that the control station 101 has a propagation path information acquisition unit 114 and the signal processor 107 has a reception digital signal processor 115.

The reception digital signal processor 115 takes out the propagation path information, executing demodulation processing on the reception digital signal that is received by way of an extended base station 102 and includes the propagation path information. The reception digital signal processor 115 executes processing on the reception digital signal for, for example, quadrature amplitude demodulation, debit interleaving, error correction decoding, descrambling and a cyclic redundancy check.

The propagation path information acquisition unit 114 acquires propagation path information from a user terminal by way of an extended base station 102 and the reception digital signal processor 115. Propagation path information is a propagation path matrix of $N_r \times N_t$ dimensions using, for example, reception power, reception SNR (signal to noise ratio), reception SINR (signal to interference plus noise ratio) and frequency response as elements. The elements of the propagation path matrix may be quantized frequency responses. The method of acquiring a propagation path matrix may be a method of receiving the index of the sample (codeword) showing the strongest correlation among a set of analog values or a set of samples (codebook) as fed back from the user terminal.

The propagation path information acquiring unit 104 notifies the scheduling unit 104 and the transmission digital signal processor 113 of the signal processor 107 of the acquired propagation path information.

The scheduling unit 104 selects a user terminal that is the destination of transmission of the user data and an extended base station for transmitting the user data, using the acquired propagation path information. Additionally, the scheduling unit 104 determines if a cooperative communication is to be made or not, using the acquired propagation path information.

The transmission digital signal processor 113 determines the transmission weight, using the acquired propagation path information, generates a signal obtained by multiplying a data signal by the transmission weight and transmits it to the user terminal by way of the extended base station 102.

Now, the method of acquiring propagation path information and a cooperative communication using propagation path information will be described below.

Firstly, acquisition of propagation path information for making a cooperative communication will be described.

When, for example, extended base station 102$i$ and extended base station 102$j$ operate for cooperative communication for a user terminal located in the cell formed by the extended base station 102$i$, the scheduling unit 104 notifies the identifier memory unit 111$j$ that corresponds to the extended base station 102$j$ of the identifier i of the extended base station 102$i$. The training signal generating units 112$i$ and 112$j$ of the extended base stations 102$i$ and 102$j$ generate training signals, referring to the respective identifier memory units 111$i$ and 111$j$ and transmit the same training signals. As a result, the user terminal can receive the training signal synthesized in space (propagation path) to know the reception power at the time of cooperative communication, the reception SNR and the reception SINR. The user terminal feeds back the propagation path information to the extended base station 102$i$. The propagation path information acquisition unit 114 can acquire the propagation path information of the user terminal by way of the extended base station 102$i$ and the reception digital signal processor 115.

The extended base station 102$i$ and the extended base station 102$j$ may transmit same training signals at different time points and the user terminal may individually estimate their respective propagation paths and feed them back as a method of acquiring the propagation path matrix between the extended base station 102$i$ and the user terminal and the propagation path matrix between the extended base station 102$j$ and the user terminal. Alternatively, the scheduling unit 104 may notify the identifier memory unit 111$j$ that corresponds to the extended base station 102$j$ of the identifier i of the extended base station 102$i$ in advance and the extended base stations 102$i$ and 102$j$ may estimate the respective propagation path matrices by receiving a known signal from the user terminal. When each of the extended base stations 102$i$ and 102$j$ only requires the reception power as the propagation path information of the user terminal, they can acquire information on the reception power from the user terminal without that the scheduling unit 104 notifies the identifier memory unit 111$j$ that corresponds to the extended base station 102$j$ of the identifier i of the extended base station 102$i$ as described above.

The propagation path information acquiring unit 114 notifies the scheduling unit 104 of the acquired propagation path information.

Note that, when no cooperative communication is to be made and the propagation path information is to be acquired, the extended base station 102 transmits a known signal to the user terminal, using a measurement resource. The propagation path information acquisition unit 114 acquires the propagation path information by way of the extended base station 102 and the reception digital signal processor 115.

Now, a cooperative communication using propagation path information will be described below.

The scheduling unit 104 selects a combination of a user terminal that is the destination of a user data and an extended base station 102 for transmitting the user data, using the propagation path information notified from the propagation path information acquisition unit 114.

In this instance, the scheduling unit 104 uses an index of the reception power, the reception SNR (signal to noise ratio), the reception SINR (signal to interference plus noise ratio) and the propagation path response amplitude acquired as propagation path information and selects a combination of a user terminal and an extended base station 102 whose indexes show a large value. Alternatively, the scheduling unit 104 may select a combination of extended base stations and a user terminal by computing the transmission weight from the propagation path matrices and estimating the reception power of the user terminal as index, using the product obtained by multiplying the transmission weight by the transmission path matrices as effective propagation path response. The method of generating a transmission weight will be described hereinafter.

Still alternatively, SDMA (spatial division multiple access) is involved, the scheduling unit 104 may compute the correlation value of extended base stations and a user terminal and selects a combination of extended base stations and a user terminal showing a low correlation value.

Note that the scheduling unit 104 can determine if a cooperative communication is to be made or not from the propagation path information (SNR or SINR). For example, the scheduling unit 104 determines if a cooperative communication is to be made or not, comparing the communication capacity per base station as determined from propagation path information. Then, the scheduling unit 104 selects a communication that provides a larger communication capacity per base station. For example, the scheduling unit 104 compares the communication capacity of the extended base station 102$i$ as determined from the propagation path information thereof and ½ of the communication capacity of the extended base station 102$i$ and the extended base station 102$j$ when they operate for cooperative communication as determined from the propagation path information thereof and determines if a cooperative communication is to be made or not.

Now, the method of computing a transmission weight, using propagation path information, will be described below.

The scheduling unit 104 notifies the propagation path information acquisition unit 114 of information on the combination of extended base stations and a user terminal that the scheduling unit 104 selects as a result of scheduling.

The propagation path information acquisition unit 114 notifies the transmission digital signal processors 113 that correspond to the selected extended base stations of information on propagation paths between the extended base stations and the user terminal that are selected on the basis of the notified result of scheduling. For example, when the extended base stations 102$i$ and 102$j$ operate for cooperative communication for a user terminal belonging to the cell of the extended base station 102$i$, the propagation path information acquisition unit 114 notifies the transmission digital signal processor 113$i$ of the propagation path matrices between the extended base station 102$j$ and the user terminal and between the extended base station 102$i$ and the user terminal. Additionally, the propagation path information acquisition unit 114 notifies the transmission digital signal processor 113$j$ of the propagation path matrices between the extended base station 102$j$ and the user terminal and between the extended base station 102$i$ and the user terminal.

The transmission digital signal processors 113 execute transmission processing on the data signal and the training signal and generates a digital signal that include the data signal and the training signal.

The transmission digital signal processors 113$i$ and 113$j$ computationally determine transmission weights from the propagation path matrices between the extended base station 102$i$ and the user terminal and between the extended base station 102$j$ and the user terminal and transmit signals obtained respectively by multiplying the data signal vectors s by the transmission weights $W_t$ to the user terminal. As in the first embodiment, if the propagation path matrices between the extended base station 102$i$ and the user terminal and the extended base station 102$j$ and the user terminal are $H_1$ and $H_2$, the reception signal vector y of $N_r$ dimensions that the user terminal receives is expressed by mathematic formula (4).

$$y=HW_t s+n$$

$$H=[H_1, H_2]$$

$$W_t=H^H(HH^H)^{-1} \quad (4)$$

Note that, while the method of the mathematical formula (4) is employed for computationally determining the transmission weight $W_t$, this computation method is an exemplar computation method conforming to the ZF criterion. However, the method of computationally determining a transmission weight $W_t$ is by no means limited to this method and some other criterion may alternatively be employed.

Thus, the wireless communication device of this embodiment can acquire propagation path information for a cooperative communication even in a system of employing a training signal that is specific to the identifier of a base station. Then, as a result, transmission processing such as transmission beam forming becomes feasible to make it possible to further improve the throughput.

[Third Embodiment]

The configuration of the wireless communication device of the third embodiment is similar to that of the wireless communication device of the second embodiment shown in FIG. 7. The wireless communication device of the third embodiment differs from the wireless communication device of the second embodiment in that the former transmit not only user data but also a control signal by means of transmission beam forming when operating for a cooperative communication.

Extended base stations 102 transmit a control signals with a predetermined cycle period to a user terminal located in the cell that an extended base station 102 forms. The user terminal can confirm that the connection with the extended base station to whose cell it belongs is maintained by receiving these control signals. When the user terminal cannot receive these control signals, the user terminal issues a handover request. Additionally, there may be instances where the user terminal issues a handover request when it receives control signals from different extended base stations.

A control signal is a signal that is generated from control data and a training signal that is described earlier. Therefore, when extended base stations 102$i$ and 102$j$ are operating for a cooperative communication at a timing of transmitting a control signal as described earlier by referring to FIG. 6, the extended base station 102$j$ transmits a control signal that includes a training signal that is specific to identifier i and control data that corresponds to the extended base station 102$i$. In such an instance, as the user terminal located in the cell formed by the extended base station 102$j$ receives the control signal, there can be an occasion where the user terminal recognizes the control signal as a control signal transmitted from the extended base station 102$i$ and issues a handover request. To prevent a handover request from being issued, it is necessary to operate for beam forming so that the user terminal located in the cell formed by the extended base station 102$j$ may not receive the control signal when the extended base station 102$j$ transmits the control signal.

Figure 9:
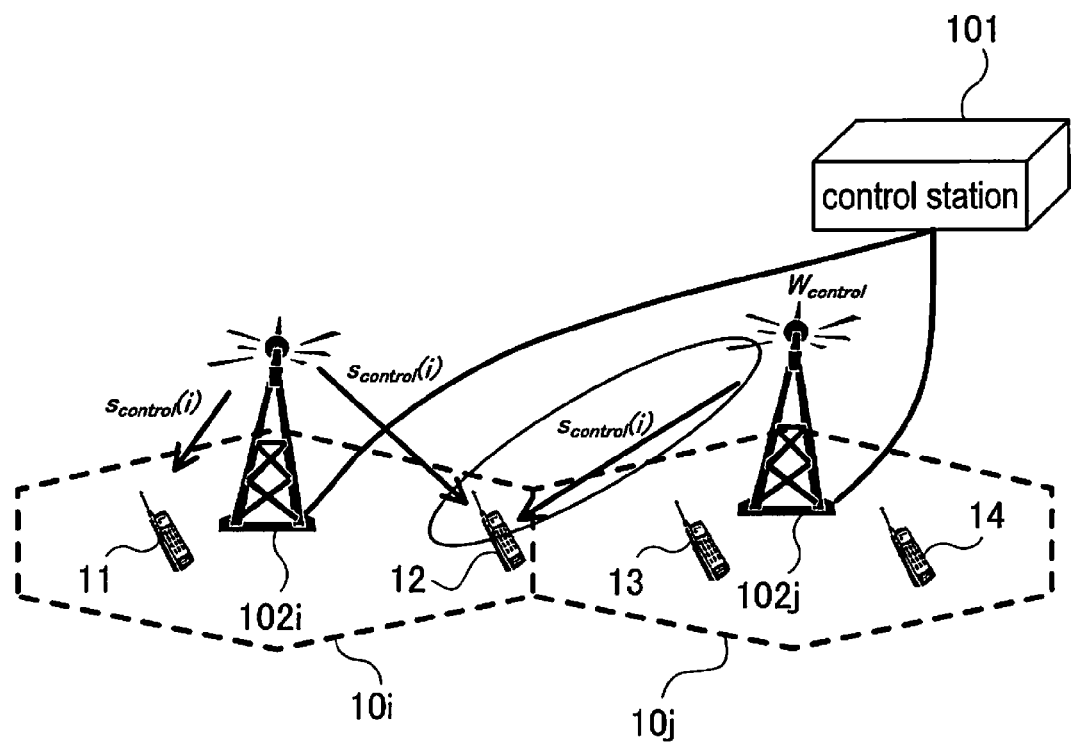
FIG. 9 is a schematic illustration of control signals that the wireless communication device of the third embodiment transmits.

FIG. 9 schematically illustrates how the wireless communication device of this embodiment transmits control signals.

As shown in FIG. 9, the wireless communication device of this embodiment multiplies control signal vector $s_{control}(i)$ by transmission weight $W_{control}$ when transmitting a control signal (e.g., a common control signal or an individual control signal) to the user terminal 12 located in the cell formed by the extended base station 102$i$ by means of cooperative communication. At this time, the wireless communication device employs such a transmission weight that directs null beams to user terminals located in the cell formed by the extended base station 102$j$ so that the control signal may not be received by those user terminals. It is assumed here that the transmission digital signal processor 113$j$ computationally determines and holds the transmission weight. The transmission signal vector x of $N_s$ dimensions that is transmitted from the extended base station 102$j$ can be expressed by mathematical formula (5).

$$x=W_{control}s_{control}(i) \quad (5)$$

$W_{control}$ can be computationally determined from information on the propagation path between the extended base station 102$j$ and the user terminal 11 that belongs to the cell formed by the extended base station 102$i$ and information on the propagation paths between the extended base station 102$j$ and the user terminals 13 and 14 located in the cell formed by the extended base station 102$j$. Note, however, that the value obtained by calculations in advance for a control signal to a cell end, using the angle at the cell end position, may alternatively be employed as information on the propagation path between the extended base station 102$j$ and the user terminal 12.

As shown in FIG. 9, null beams can be directed to the user terminals 13 and 14 located in the cell formed by the extended base station 102$j$ as the extended base station 102$j$ transmits transmission signal vector x of $N_s$ dimensions obtained by multiplying control signal vector $s_{control}(i)$ by transmission weight $W_{control}$. Then, the user terminals 13 and 14 located in the cell formed by the extended base station 102$j$ are prevented from receiving the control signal vector $s_{control}(i)$ and hence from issuing a handover request.

As described above, with the wireless communication device of this embodiment, when an extended base station transmits a control signal to a different extended base station when they are operating for a cooperative communication, the user terminals belonging to the cell formed by the latter extended base station are prevented from issuing an unnecessary handover request by means of transmission beam forming of directing null beams to the user terminals that prevents the user terminals from receiving the control signal.

[Fourth Embodiment]

Figure 10:
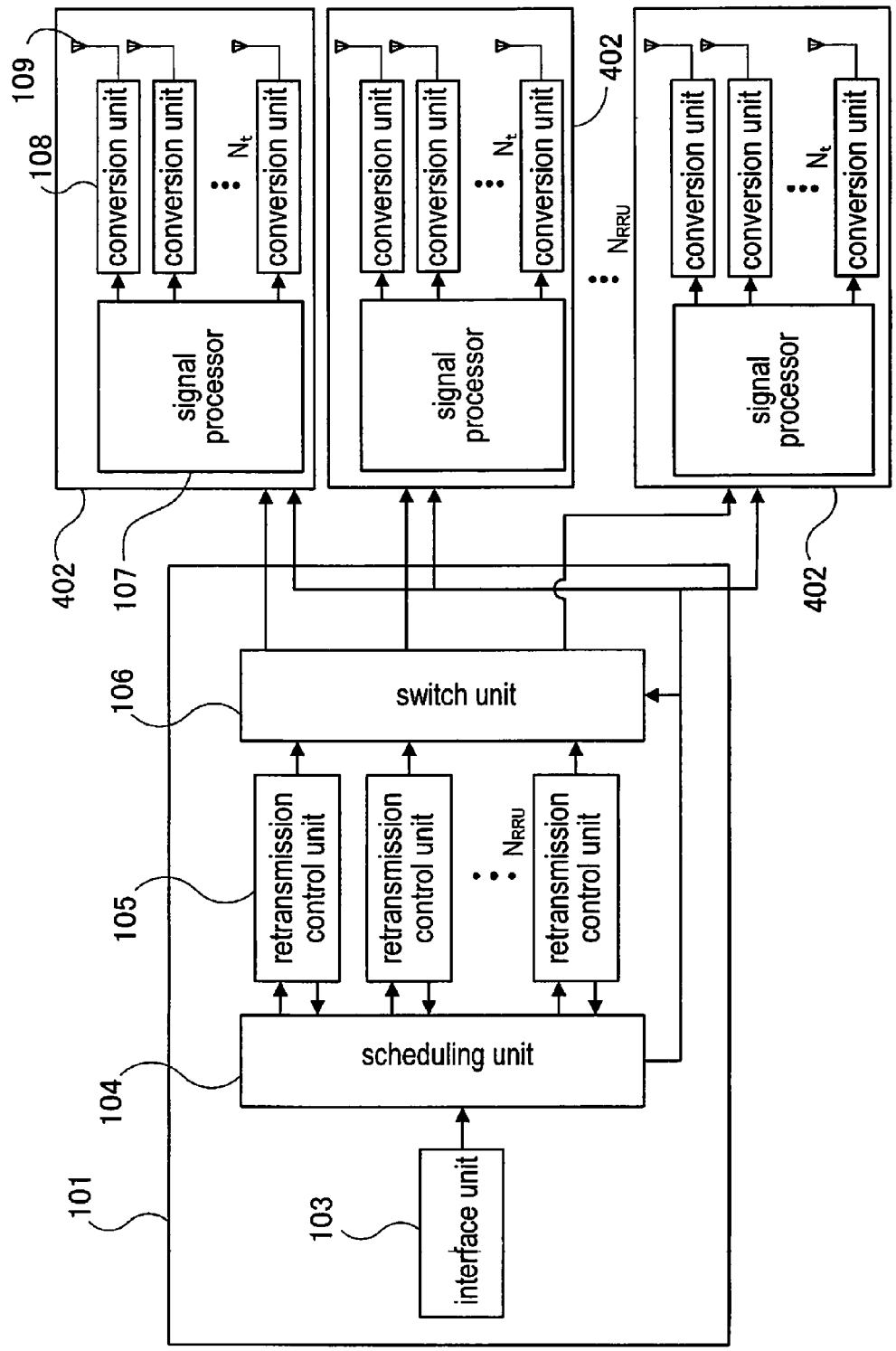
FIG. 10 is a schematic block configuration diagram of the wireless communication device according to the fourth embodiment.

FIG. 10 schematically illustrates wireless communication device according to the fourth embodiment. The wireless communication device of the fourth embodiment differs from the wireless communication devices of the first through third embodiments in that extended base station stations 402 include corresponding signal processors 107. Otherwise, this embodiment is same as the first through third embodiments in terms of configuration and operation method and hence the description of the configuration and that of the operation method of this embodiment are omitted.

The wireless communication device of this embodiment provides advantages similar to those of the wireless communication device of the first embodiment.

A wireless communication device according to the embodiment can be realized, for example, by using a general purpose computer as basic hardware. More specifically, the conversion unit 108, the I/F unit 103, the scheduling unit 104, the retransmission control unit 105, the switch unit 106 and the data signal generating unit 110, the identifier memory unit 111, the training signal generating unit 112 and the transmission digital signal processor 113 of the signal processor 107 can be realized by causing the processor installed in the above-described computer to execute a program. Then, the wireless communication device may be realized by installing the program in the computer in advance, by storing the program in a storage medium such as CD-ROM or by distributing the program by way of networks so that the program may be installed in computers. Additionally, the identifier memory unit 111 maybe realized by appropriately utilizing a storage medium that maybe a memory contained in or attached to a computer, a hard disk, a CD-R, a CD-RW, a DVD-RAM or a DVD-R.

While certain embodiments have been described, these embodiments have been presented by way of example only, and are not intended to limit the scope of the inventions. Indeed, the novel methods and systems described herein maybe embodied in a variety of the other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control station to be connected to a first extended base station that forms a first cell and transmits data and training signals and a second extended base station that forms a second cell and transmits data and training signals, said control station comprising:
    a first signal processor that generates a first training signal specific to the first extended base station, wherein the first training signal includes an identifier for identifying the first extended base station; and
    a second signal processor that generates a second training signal specific to the second extended base station, wherein the second training signal includes an identifier for identifying the second extended base station,
    wherein in a case of performing cooperative communication in which same user data is transmitted to a first user terminal located in an overlapping area of the first cell and the second cell via the first extended base station and the second extended base station, the first signal processor and the second signal processor generate first training signals including the identifier for identifying the first extended base station, and both a training signal to be transmitted to the first user terminal via the first extended base station and a training signal to be transmitted to the first user terminal via the second extended base station are the first training signals which include the identifier for identifying the first extended base station.

2. The control station according to claim 1, further comprising a scheduling unit that determines an extended base station from among the first extended base station and the second extended base station that is operated for transmitting the data to the first user terminal by means of information on a propagation path between the first user terminal and each of the first and second extended base stations.

3. The control station according to claim 2, wherein:
    a control signal for checking a state of connection with the second extended base station is periodically transmitted to a user terminal located in the second cell via the second extended base station; and
    a period of the cooperative communication is made shorter than a cycle period of transmission of the control signal from the second extended base station.

4. The control station according to claim 2, wherein a control signal for checking a state of connection with the second extended base station is transmitted via the second extended base station by means of a beam that directs null beams to a user terminal located in the second cell during a period of the cooperative communication.

5. A wireless system that includes:
    a first extended base station that forms a first cell and transmits data and a training signal;
    a second extended base station that forms a second cell and transmits data and a training signal; and
    a control station connected to the first extended base station and the second extended base station,
    wherein the control station comprises:
    a first signal processor that generates a first training signal specific to the first extended base station, wherein the first training signal includes an identifier for identifying the first extended base station; and
    a second signal processor that generates a second training signal specific to the second extended base station, wherein the second training signal includes an identifier for identifying the second extended base station,
    wherein in a case of performing cooperative communication in which same user data is transmitted to a first user terminal located in an overlapping area of the first cell and the second cell via the first extended base station and the second extended base station, the first signal processor and the second signal processor generate first training signals including the identifier for identifying the first extended base station, and both a training signal to be transmitted to the first user terminal via the first extended base station and a training signal to be transmitted to the first user terminal via the second extended base station are the first training signals which include the identifier for identifying the first extended base station.

6. The control station according to claim 1, further comprising:
    a first retransmission control unit which corresponds to the first signal processor and which receives user data to be transmitted to the first user terminal;
    a second retransmission control unit which corresponds to the second signal processor and which receives user data to be transmitted to the first user terminal; and
    a switch unit through which the first retransmission control unit and the second retransmission control unit are connected to the first signal processor and the second signal processor,
    wherein in a case of performing normal communication, the switch unit connects the first retransmission control unit to the first signal processor and connects the second retransmission control unit to the second signal processor, and the first signal processor and the second signal processor respectively generate the first and second training signals, and
    wherein in the case of performing cooperative communication, the switch unit switches connectional relations between the first and second retransmission control units and the first and second signal processors such that first retransmission control unit is connected to both the first signal processor and the second signal processor, and the first signal processor and the second signal processor both generate the first training signals including the identifier for identifying the first extended base station, the first training signals being transmitted to the first user terminal via the first extended base station and via the second extended base station.

7. The wireless system according to claim 5, wherein the control station further comprises:

a first retransmission control unit which corresponds to the first signal processor and which receives user data to be transmitted to the first user terminal;

a second retransmission control unit which corresponds to the second signal processor and which receives user data to be transmitted to the first user terminal; and a switch unit through which the first retransmission control unit and the second retransmission control unit are connected to the first signal processor and the second signal processor, wherein in a case of performing normal communication, the switch unit connects the first retransmission control unit to the first signal processor and connects the second retransmission control unit to the second signal processor, and the first signal processor and the second signal processor respectively generate the first and second training signals, wherein in the case of performing cooperative communication, (i) the switch unit switches connectional relations between the first and second retransmission control units and the first and second signal processors such that first retransmission control unit is connected to both the first signal processor and the second signal processor, (ii) the first signal processor and the second signal processor both generate the first training signals including the identifier for identifying the first extended base station, and (iii) the first extended base station and the second extended base station respectively transmit the first training signals including the identifier for identifying the first extended base station, to the first user terminal.

* * * * *